Figure 1:
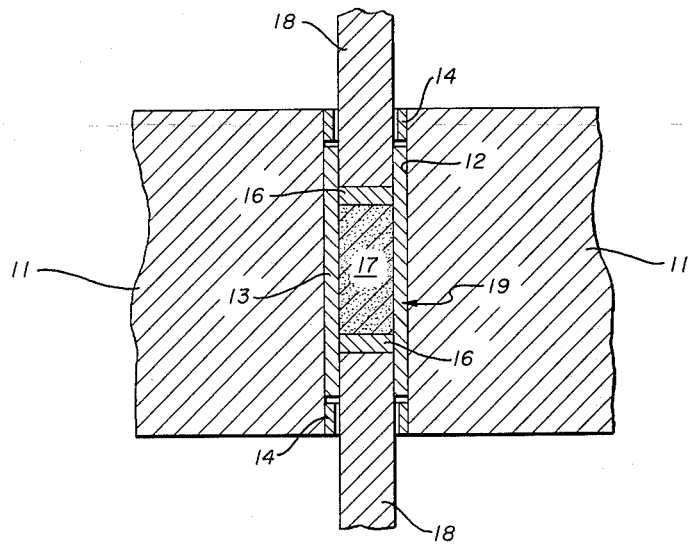

March 14, 1961     C. M. GORDON     2,975,113
METHOD OF FABRICATION OF AN IRRADIATION
TRANSMUTATION CAPSULE
Filed Nov. 28, 1956

INVENTOR.
CARROLL M. GORDON
BY
ATTORNEY.

Patented Mar. 14, 1961

2,975,113
METHOD OF FABRICATION OF AN IRRADIATION TRANSMUTATION CAPSULE

Carroll Maret Gordon, Danville, Calif., assignor to the United States of America as represented by the United States Atomic Energy Commission Filed Nov. 28, 1956, Ser. No. 624,950

13 Claims. (Cl. 204—154.2)

This invention relates to a capsule for irradiating transmutable substances, e.g., in nuclear reactors. More particularly, this invention relates to a compacted irradiation capsule which is especially adapted for the high level irradiation of certain materials to produce relatively large amounts of transmutation products.

Nuclear transmutations are effected by irradiating an appropriate target element or isotope with a variety of particles including electrons, protons, deuterons, tritons, fast and slow neutrons and the like. Conventional accelerators, nuclear reactors and other devices serve as a source of such particles and a variety of irradiation techniques have been developed for carrying out various transmutations on experimental or laboratory scale and for the production of rather low concentrations of certain materials in relatively large amounts of a fertile material.

With low level irradiations primitive target arrangements may be employed since no severe conditions are ordinarily encountered in these circumstances. For example, the target material may be formed into a thin foil or exposed in powdered form to the irradiating particles. Where only a few milligrams or less of an isotope are desired, it is common to fabricate an irradiation capsule by disposing a few grams of the isotope or a chemical compound thereof, which is to be transmuted, e.g., by neutron irradiation, within a thin quartz tube or boat. The boat is placed in a plugged sleeve made of aluminum or other suitable metal and of dimensions appropriate to fit within a test hole or channel of the reactor which is to serve as the source of neutrons. Metal powder or shavings of a relatively unreactive, heat stable metal, such as aluminum, are then poured loosely around the boat within the plugged sleeve. The sleeve is plugged at the other end with just sufficient pressure to produce a pressure fit. The irradiation capsule is then ready to be positioned in the nuclear reactor. Capsules may be produced in various other shapes and sizes depending upon the techniques used and the amount of end product required.

Once within a pile, transmutation of the initial isotope begins when the neutrons impinge thereon and continues at a rate determined by the reaction cross section of the initial isotope, the energy and flux of the neutrons and other factors well known within the reactor art. The maximum concentration of product isotope produced, to a first approximation, will depend upon half-lives and the fission cross section of the source and product isotopes for any given neutron flux. For this reason transmutation reactions initiated within a nuclear reactor for the purposes of making large amounts of material are not ordinarily practical unless the half-life is large enough for the concentration to build up over practical irradiation periods. A high neutron flux and consequent high reaction rate may be necessary to offset a short half-life and otherwise be essential when large amounts of a product isotope are to be produced. Transmutations in which substantial fission or other competitive reactions take place or those employing dilute source materials may be impractical due to the difficulty of subsequent separation procedures. Accordingly, it is desirable to employ an irradiation setup in which the product is as undiluted with extraneous material as possible.

During irradiation within the pile, heat is generated both by the transmutation and fission reactions and by any subsequent disintegrations. This heat accumulates and, if not removed by exchange or conductance to the exterior of the irradiation capsule, creates hot spots within the capsule leading to subsequent melting of the capsule and perhaps rupture of the lining of the reactor test channel. Ordinarily the process of transmutation and fissioning is slow enough that removal of heat constitutes no problem. For example, in the irradiation capsule containing the quartz tube, previously mentioned, the heat generated within the boat would ordinarily be conducted slowly by the metal shavings or powder to the exterior wall of the irradiation capsule. Once through that wall the heat would be removed by the air, water, liquid sodium or other means by which the reactor is cooled. Nor would it matter if the initial isotope were to be in the form of an oxide or other chemical combination. While many, if not most, chemical compounds are notoriously poor conductors, they are still sufficiently good to conduct the maximum amount of heat produced in usual low level irradiations of the foregoing type.

With high level irradiations, i.e., with concentrated or undiluted target material and high irradiation fluxes resulting in a high nuclear reaction rate, including all of the effective transmutation reactions, competitive reactions and other associated reactions, the removal of heat, thermal stability and stability of the assembly under intense irradiation, become crucial limitations. As a practical matter, about 1,000 watts of heat, at the maximum, can be conducted away from each square inch of surface per second within conventional nuclear reactors, depending, of course, upon the type of cooling and coolant materials. Accordingly, the design of the reactor imposes a correlative limit to the amount of heat which can be delivered by the surface of the irradiation capsule. Operating at this level of heat output precludes the possibility of using usual arrangements where localized heating will develop because of the heterogeneous distribution and difference in conductivty of the various materials in the irradiation capsule. Where the materials enclosed within the irradiation capsule are metals of somewhat similar properties, it would seem that the obvious solution would be to melt and cast the material into a slug in the same manner as is done in the production of nuclear reactor fuel elements. The metals would be relatively good heat conductors and they would be expected to form solid solutions such that hot spots would not be created by heterogeneous dispersion of the isotope creating the heat. However, this arrangement incurs several disadvantages when used for transmutation operations. To produce the metal, beginning usually with an oxide, is a difficult and costly process, especially for many of the isotopes in the lanthanideactinide series of elements. A certain amount of waste is involved which entails additional expense. In many instances the isotopes to be transmuted are radioactive and it is necessary to employ difficult precautionary measures against both solid and gaseous activity hazards. The hazard would become increasingly critical as greater amounts of radioactivity are contained in the casting.

It has now been discovered that oxide and fluoride compounds of certain target elements or isotopes thereof can be admixed with a ductile and malleable metal in powdered form and the admixture compacted with extreme pressure to yield a compacted target which can be irradiated at high levels. Moreover by disposing the aforesaid admixture in a container of said metal and then compacting the assembly there is produced an irradiation capsule in which the target element to be transmuted is disposed in a compacted core sheathed with said metal.

Manifold benefits accrue through the use of a chemically combined form of the isotope to be transmuted in the irradiation capsule, e.g., costly production of the metal is avoided. Furthermore, should an accident occur whereby the capsule or coolant channel became ruptured, the compound form of the isotope does not react with the coolant and disperse as readily as the metal—lessing the danger of contamination. The compound form, especially the oxide, does not separate as it would in a casting operation to form an inhomogeneous slag. Moreover, the uniformity of the dispersion of the compound in the matrix metal of the compact overcomes the inherently poor thermal conductivity of the compound. The dispersion of such a compound to produce homogeneous castings is difficult and inhomogeneous castings tend to develop hot spots. Accordingly, the present method permits the high level irradiation of relatively concentrated target materials and the facilitated production of macro amounts of certain isotopes.

It is a prime object of the invention to provide methods and apparatus for conducting high level irradiation transmutation reactions.

Another object of the invention is to provide a novel irradiation capsule.

A further object of this invention is to provide an irradiation capsule in which transmutation reactions may be carried out at high irradiation rates.

A still further object of this invention is to provide an irradiation causule in which metallic oxides, fluorides or mixtures thereof are uniformly dispersed together with a high thermal conductivity metal in a compacted core.

Another object of this invention is to provide an irradiation capsule with improved heat stability and which may be subjected to high level irradiation.

Still another object of this present invention is to provide an irradiation capsule relatively expeditiously, at a lower cost and with low attendant radioactivity hazards.

Figure 2:
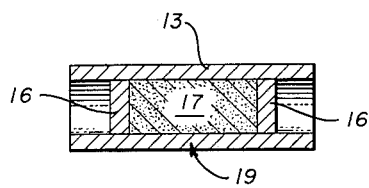

Other objects and advantages of the invention will become apparent by consideration of the following description taken in conjunction with the accompanying drawing of which:

Figure 1 is a vertical cross sectional view of an irradiation capsule being formed in a positive pressure, double ram hdraulic press; and Figure 2 is a longitudinal cross sectional view of an irradiation capsule produced by the compaction method of the invention.

The manipulative details of the fabrication of an irradiation target capsule, in accordance with the invention, will now be described with reference to Fig. 1 of the drawing. As illustrated therein, there is employed a compression molding die arrangement including a die body 11 having a cylindrical cavity 12 extending therethrough. Customarily, as the first operation in the fabrication process, a sleeve 13 of an appropriate metal and selected as described below, is disposed centrally in said cavity 12 and positioned as by means of sleeve rings 14 disposed terminally in said cavity. A clearance of about 0.0002 inch is allowed to permit easy insertion and subsequent removal. A slip-fit plug 16 of said metal is inserted in the lower end of the sleeve 13 and a homogeneous comminuted mixture 17 of the isotope compound which is to be irradiated and said metal is introduced therein, said mixture 17 being formulated and prepared as described below. Another slip-fit plug 16 is then inserted in the upper end of sleeve 13, or upper sleeve ring 14 and the molding die assembly is transferred to a double ram hydraulic press (partial view). In said press the upper and lower rams 18 are applied against the upper and lower slip-fit plugs 16 so as to exert sufficient pressure to compact the mixture 17 to near theoretical density and to essentially fuse the entire sleeve assembly to provide the completed irradiation capsule 19 which is also illustrated in detail in Fig. 2. of the drawing. Excess end material of sleeve 13 may be removed or retained to serve as a positioning stop as desired. The irradiation capsule 19 is then in condition for irradiation at the extraordinarily high levels described hereinafter or by various obvious conventional methods.

Certain nuclear, physical and chemical properties govern the choice of the metal used in fabricating the sleeve sheath of the capsule and matrix of the compacted mixture therein. In practice aluminum has been found completely satisfactory and preliminary fabrication experiments indicate that zirconium is also satisfactory. However it is contemplated that other metals may be substituted for either the sleeve and plug components or the powdered metal component of mixture 17 since other metals should possess similar properties. In general such metals must possess the nuclear, chemical and physical properties which are requisite for nuclear reactor applications as are well known in the art. For the present purpose it is necessary that the metal possess high heat conductivity, ductility and fusibility under high compressions.

As noted above, fluoride and oxide compounds of the element or isotope to be irradiated either alone or in admixture are employed in formulating the mixture 17. The capsule of the invention is useful for lanthanide and especially useful for actinide element irradiations or other irradiations involving high nuclear reaction cross sections and/or high irradiation fluxes. Compounds such as fluorides and especially the oxides generally have poor heat conductivities so that particles of excessive size of such irradiated materials become extremely hot causing mechanical or thermal failure of the irradiated mass. In accordance with the present invention, the indicated compound is reduced to a small particle size and admixed in the powdered metal in proportions which eliminate this difficulty. Representatively, oxides of the lanthanides, actinides, iron, nickel and the fluorides of lanthanides and alkali metals have been used successfully in fabricating such capsules. In view of the variety of such materials similar compounds of other elements should also be found satisfactory. With the higher irradiation levels currently in use, about 1 to 8% by weight of the oxide in powered aluminum has been successfully used; however, mechanically satisfactory compacts using 30% of oxides have been fabricated and may be used where lower cross sections or lower intensity irradiation condition may be used. Similar proportions of fluorides and admixtures can likewise be employed.

Frequently the target isotope will be radioactive, particularly when the actinides or lanthanides are to be irradiated. In this case it is generally advantageous to precompact the matrix metal-oxide mixture prior to final compaction for the reason that less displacement is necessary in the final operation and therefore less radioactivity adheres to the inside ends of the sleeve exterior to the plugs.

Heat conductivity in particles of low thermal conductivity which are exposed in a nuclear reactor involves some unusual considerations. If the irradiated material is fissionable the major portion of the produced energy is originally in the kinetic energy of the fission products which may have a transit range of about 1–10 mg. per sq. cm. of material. Accordingly, by using a transmutable material particle size corresponding to the indicated transit range or smaller, i.e., when the particle is made small enough, the fission products can be made to carry a large portion of the fission energy into the conductive matrix metal surrounding the particles in the capsule and thereby avoid undue heating of the particle. Under the high density conditions produced by fabrication of the capsule by the present method the heat conductivity of the particle itself is used to full advantage permitting the use of, e.g., oxide particle sizes of considerably greater magnitude than might be expected from range consideration alone.

From the standpoint of heat conductivity through the matrix metal of the compacted mixture it is necessary to assure continuity, otherwise agglomerates of the oxide compound may insulate localized areas and cause localized over heating. Agglomeration may also effectually increase particle size. In practice a maximum particle size of about −400 mesh has proved satisfactory. Such a material may be produced by grinding as in a ball mill or by other equivalent means.

The particle size of the comminuted matrix metal can be larger than that of the compound. For example, free-flowing, uncoated aluminum powder as employed for commercial pigments has been used satisfactorily in many operations. The aluminum powder and powdered target oxide are blended homogeneously, in above indicated proportions, by conventional methods to provide the aforesaid mixture 17. For convenience the mixture 17 may be precompacted to reduce bulk and facilitate handling particularly when radioactive materials are used. The powdered or compacted mixture is then assembled within the capsule components as described above and subjected to compaction. With aluminum metal a pressure of 10,000 to 50,000 p.s.i. is generally sufficient to cause the requisite amount of plastic flow of the aluminum and powdered mixture and compaction to at least 75% to 90% of the theoretical density of aluminum. With this amount of compression the assembly is fused into an essentially voidless and continuous structure which can be disposed in the irradiation channel of a nuclear reactor and in contact with the coolant therein. The assembly can then be considered to constitute a compacted matrix of aluminum metal with the target material dispersed homogeneously and uniformly therein and with the sleeve and end plugs fused thereto as a sheath to provide the irradiation capsule.

Further details will become apparent by consideration of the following examples in which the irradiations were performed employing the capsule of the invention and the final products were separated and purified by processes which form no part of the present invention:

*Example I*

Curium isotope 242 was produced by the irradiation of americium isotope 241, fabricated into a capsule, in a nuclear reactor. Americium as the dioxide (82% purity) containing oxide impurities in the following amounts was employed: iron 7.8%; plutonium-239, 6%; nickel 3.1%; and amounts of lanthanum, magnesium and calcium of the order of 0.1% each. 200 mg. of the oxide after grinding to −400 mesh was homogeneously mixed with aluminum dust to yield a total of approximately 20 grams of mixture and the mixture formed into an irradiation capsule using the method hereinbefore described. The finished irradiation capsule weighed approximately 49 grams.

The irradiation capsule was placed in a pile and subjected to irradiation with a neutron flux of about $5 \times 10^{14}$ n/sq. cm./sec. for 150 days. Americium has an absorption cross section of approximately 850 barns. Because of the complexity of the above reaction the overall fission cross section cannot be stated with certainty. However, at the end of the in-pile period there was found to be a 44% transmutation of the americium to curium-242, 35% transmutation to plutonium-242, and 10% transmutation to plutonium-238. 10% of the americum-241 was lost by fissioning. The capsule was tested daily for mechanical failure with negative results indicating fully satisfactory behavior under the strenuous conditions noted. Principle nuclear reactions were as follows:

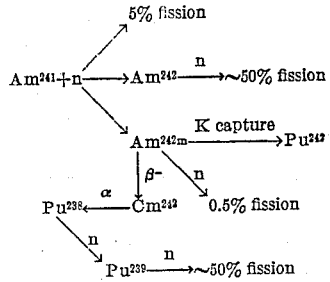

These resutls are notable since as much as 1,000 curies of alpha activity (with isotopes referred to) have been reactor produced in a single 50 gram irradiation capsule of 15 cc. volume without any deleterious effects. The curium-242 was then separated from americium and other materials by conventional techniques.

*Example II*

Neptunium 237 was produced by neutron irradiation of uranium isotope 236 in a nuclear reaction by the reactions, $U^{236}$ (n, γ) $U^{237}$ and beta decay of the $U^{237}$ to $Np^{237}$. More particularly, a 12 gram irradiation capsule, total weight, containing 0.25% uranium-236 as $U_3O_8$ formed by mixing with aluminum powder and encased in an aluminum sheath using the method described hereinbefore, was placed in a pile and irradiated with an approximately $5 \times 10^{14}$ n/sq. cm./sec. neutron flux for 300 days. The total initial weight of uranium was 18 mg. A small amount of uranium-235 was present in the uranium-236 available for experimentation. The uranium-235 fission cross section is 580 barns; its capture cross section is 107 barns; therefore most of the $U^{235}$ was eliminated by the induced fission reactions. The fission cross section of uranium-236 is unknown; however, the capture cross section is 9 barns.

On the basis of the initial weight there was a 5% conversion to neptunium-237. 90% of the uranium was recovered as uranium-236. There was less than 1% loss due to fissioning.

*Example III*

The capsule technique of the invention was employed to eliminate a small amount of uranium-235 from a specimen of uranium-238 by irradiation in accordance with the following considerations: Uranium-238 has an insignificant fission cross section and a capture cross section of 3 barns; the capture reaction produces uranium-239 by the (n, γ) reaction, and the uranium-239 decays to neptunium-239 which further decays to plutonium-239. Uranium-235 has a 580 barn fission cross section and a 107 barn capture cross section. From the relative cross sections it can be seen that $U^{235}$ tends to be eliminated by fission faster than the $U^{238}$ is transmuted. Thus, the $U^{235}$ can be entirely eliminated by neutron induced fission and transmutation with the coincident loss of only a small amount of $U^{238}$ and such a purification is most efficiently performed at high irradiation fluxes. The foregoing purification method is not a part of the present invention but may be practiced advantageously employing the teachings of the invention.

Using the fabrication method, described hereinbefore, 585 mg. of the uranium as $U_3O_8$ were mixed, pressed with aluminum dust and encased in an aluminum sheath to form the capsule. The ratio of powdered oxide to aluminum was 1:10. Total capsule weight was 12 grams. The capsule was placed in a nuclear reactor and irradiated at approximately $5 \times 10^{14}$ neutrons-sq. cm./sec. flux for 300 days. 300 mg. of uranium-238 were recovered. Less than 1 p.p.m. $U^{235}$ remained. Since this was the end product desired, no measurement of the neptunium and plutonium transmutation was made.

Example IV

Curium-242 was produced from americium-241 by the (n, β) reaction. A mixture of AmOF, AmF$_3$ and AmO$_2$ of purity corresponding to the americium dioxide used in Example I was employed. 500 mg. of the americium mixture were mixed, pressed with aluminum dust and encased with aluminum to form an irradiation capsule using the method described hereinbefore. The powder mixture weighed approximately 20 grams, and the entire capsule approximately 49 grams.

The irradiation capsule was placed in a pile having a flux of approximately $5 \times 10^{14}$ neutrons/sq. cm./sec. for 85 days. 44% of the americium was converted into curium-242.

Example V

Uranium was produced from thorium-230 by the (2n, γ) reaction, in which thorium-231 is the immediate product. The thorium-231 decays to protactinium-231 which by neutron capture and beta emission forms uranium-232. Of the various isotopes protactinium-231 is the only one with an appreciable fission cross section. Thorium-230 has a neutron capture cross section of 35 barns. The thorium-230 available contained 10% thorium-232, which has a neutron capture cross section of 7.7 barns and an inconsequential fission cross section.

123 mg. of the thorium as the dioxide were mixed with aluminum dust in an amount corresponding to 2.5% by weight of the mixture, pressed and encased in an aluminum sheath as described above. The total weight of the irradiation capsule was 12 grams. The capsule was irradiated for 300 days in a nuclear reactor having a flux of approximately $5 \times 10^{14}$ neutrons/sq. cm./sec.

The final product contained 25 mg. of protactinium-231 and 15 mg. of uranium-232.

What is claimed is:

1. In a method for preparing an irradiation capsule, the steps comprising inserting an aluminum metal sleeve into a constraining die body, inserting an aluminum plug into one end of said sleeve, introducing a finely divided homogeneous mixture of aluminum and a compound selected from the group consisting of the oxides, fluorides and mixtures thereof of a target element selected from the group consisting of lanthanides and actinides into said sleeve, inserting a plug of said metal into the other end of said sleeve, and then applying a high compressive force through said plugs to compact and plastically deform the assembly produced in the foregoing steps to form said capsule.

2. In a method for preparing an irradiation capsule, the steps comprising inserting a sheath metal sleeve into a die, inserting a plug of said metal into one end of said sleeve, introducing a homogeneous mixture of powdered aluminum metal and a target element compound powdered to below about −400 mesh, said compound being selected from the groups consisting of the oxides, fluorides and mixtures thereof of lanthanide and actinide elements, into said sleeve, inserting an aluminum plug into the other end of said sleeve, and then applying a high compressive force through said plugs to compact and plastically deform the assembly produced in the foregoing steps into said capsule.

3. In a method for preparing an irradiation capsule, the steps comprising inserting a sheath metal sleeve into a die, inserting a plug of said metal into one end of said sleeve, introducing a homogeneous mixture of powdered aluminum metal and less than about 8% of a target element compound powdered to below about −400 mesh, said compound being selected from the groups consisting of the oxides, fluorides and mixtures thereof of lanthanide and actinide elements, into said sleeve, inserting an aluminum plug into the other end of said sleeve, and then applying a high compressive force through said plugs to compact and plastically deform the assembly produced in the foregoing steps to at least 75 to 90% of the theoretical density yielding said capsule.

4. The process as defined in claim 3 but wherein said element comprises americium.

5. The process as defined in claim 3 but wherein said element comprises uranium isotope 236.

6. The process as defined in claim 3 but wherein said element comprises thorium isotope 230.

7. In a method for transmuting gram or larger quantities of oxides and fluorides of lanthanides by bombardment with high energy particles, comprising the steps of inserting a sheath aluminum sleeve into a die, inserting a plug of aluminum into one end of said sleeve, introducing a homogeneous mixture of powdered aluminum metal and less than about 8% of a target element compound powdered to below about −400 mesh, said compound being selected from the oxides and fluorides and mixtures thereof of lanthanide and actinide elements, into said sleeve, inserting an aluminum plug into the other end of said sleeve, applying a high compressive force through said plugs to compact and plastically deform the assembly produced in the foregoing steps to at least 75 to 90% of the theoretical density of aluminum, placing said capsule in a liquid cooled channel of a nuclear reactor, and irradiating said irradiation capsule with a thermal neutron flux not greater than an amount which produces an amount of heat equivalent to 1,000 watts per second per square inch of surface area.

8. In a method for transmuting gram quantities of materials in a nuclear reactor comprising the steps of inserting a sheath aluminum sleeve into a die, inserting a plug of aluminum into one end of said sleeve, introducing a homogeneous mixture of powdered aluminum metal and less than about 8% of a target element compound powdered to below about −400 mesh, said compound being selected from the group consisting of the oxides and fluorides of americium-241, plutonium-239, uranium-236, uranium-235, uranium-238 and thorium-230, into said sleeve, inserting an aluminum plug in the other end of said sleeve, applying a high compressive force through said plugs to compact and plastically deform the assembly produced in the foregoing steps to at least 75% to 90% of the theoretical density of aluminum, said assembled capsule weighing not more than 50 grams, placing said capsule in a liquid cooled channel of a nuclear reactor, and irradiating said capsule with a thermal neutron flux at least as high as $5 \times 10^{14}$ neutrons/sq. cm./sec. as long as the amount of heat released is not greater than that equivalent to 1,000 watts per second per square inch of surface area of said capsule.

9. The method of claim 8 in which 200 milligrams of americium-241 dioxide is irradiated in a flux of $5 \times 10^{14}$ neutrons/sq. cm./sec. for 150 days.

10. The method of claim 8 in which 18 mg. of uranium-236 oxide is irradiated in a flux of $5 \times 10^{14}$ neutrons/sq. cm./sec. for 300 days.

11. The method of claim 8 in which 585 mg. of uranium-238 containing residual amounts of uranium-235 is irradiated in a flux of $5 \times 10^{14}$ neutrons/sq. cm./sec. for 300 days.

12. The method of claim 8 in which 500 mg. of a mixture of AmOF, AmF$_3$ and AmO$_2$ is irradiated in a flux of $5 \times 10^{14}$ neutrons/sq. cm./sec. for 85 days.

13. The method of claim 8 in which 123 mg. of thorium-230 dioxide is irradiated in a flux of $5 \times 10^{14}$ neutrons/sq. cm./sec. for 300 days.

References Cited in the file of this patent

UNITED STATES PATENTS

| | | |
|---|---|---|
| 1,754,178 | Muir | Apr. 8, 1930 |
| 2,123,416 | Graham | July 12, 1938 |
| 2,365,083 | Jarrett | Dec. 12, 1944 |

(Other references on following page)

UNITED STATES PATENTS

| | | |
|---|---|---|
| 2,405,201 | Franck | Aug. 6, 1946 |
| 2,476,644 | Wallhausen et al. | July 19, 1949 |
| 2,479,882 | Wallhausen et al. | Aug. 23, 1949 |
| 2,592,115 | Carroll | Apr. 8, 1952 |
| 2,756,492 | Pettibone | July 31, 1956 |
| 2,805,473 | Handwerk et al. | Sept. 10, 1957 |
| 2,797,333 | Reiffel | June 25, 1957 |
| 2,843,539 | Bornstein | July 15, 1958 |

FOREIGN PATENTS

| | | |
|---|---|---|
| 648,293 | Great Britain | Jan. 3, 1951 |

OTHER REFERENCES

Proceedings of the International Conference on the Peaceful Uses of Atomic Energy, held in Geneva August 8–20, 1955, vol. 9, United Nations, N.Y., pp. 196–202. In Library.